H. P. KRAFT.
TIRE VALVE.
APPLICATION FILED JUNE 15, 1916.

1,290,582.

Patented Jan. 7, 1919.

WITNESSES:
René Meine
L. L. Wallace

INVENTOR
Henry P. Kraft
By Attorneys,
Fraser Furk & Myers

UNITED STATES PATENT OFFICE.

HENRY P. KRAFT, OF RIDGEWOOD, NEW JERSEY.

TIRE-VALVE.

1,290,582. Specification of Letters Patent. Patented Jan. 7, 1919.

Original application filed July 25, 1914, Serial No. 853,126. Divided and this application filed June 15, 1916. Serial No. 103,847.

*To all whom it may concern:*

Be it known that I, HENRY P. KRAFT, a citizen of the United States of America, residing in Ridgewood, in the county of Bergen and State of New Jersey, have invented certain new and useful Improvements in Tire-Valves, of which the following is a specification.

This application is a division of my application filed July 25, 1914, No. 853,126.

This invention relates to tire valves, and aims to provide certain improvements therein.

The invention is directed toward that form of tire or other valve which normally has a spring pressing the valve to its seat, although it may be used in connection with valves which are loosely mounted, and require air or other pressure to close them in use. Spring-pressed valves have very largely gone into use for pneumatic tires or similar purposes, the spring being desirable to insure tight closing of the valve, particularly under low pressures. In tire valves or other small valves, particularly of the Schrader type, the valve mechanism, comprising a valve proper and its seat, are removable bodily from the shell or casing, and the spring is placed under tension during the act of insertion. In such valves the valve proper is necessarily very small, and its seating face is composed of rubber which by reason of the small size of the valve proper cannot be made of large dimensions. Practice has shown that the packing of the valve must be more or less resilient, and a comparatively soft rubber is hence used for this purpose.

It has been found in practice that with this type of valve the pressure of the valve against its seat is apt to form a depression in the rubber packing. This is necessary in the operation of the valve in use, but while the valve is not in use such pressure is detrimental. After the valves are manufactured considerable time often elapses before they go into use and it is the object of the present invention to provide means for depressing the valve to hold it away from its seat during such time, so that when the valve is put in use the valve packing still has a smooth and efficient seating surface. Such means must necessarily be very cheap and sufficiently strong and durable to withstand the ordinary shocks of transportation and handling.

In the drawings which illustrate the invention,—

Figure 1:
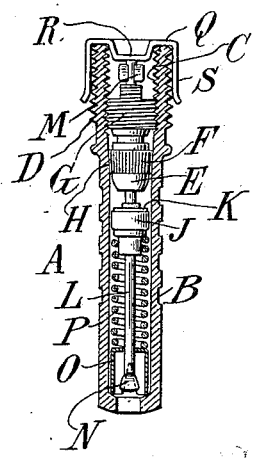
Figure 1 is a diametrical section of the valve with my invention in place thereon.

Referring to the drawings, let A indicate a tire valve which comprises a shell B of suitable dimensions having an internal screw-thread C at its top and an external screw-thread D also at its top. E is the valve seat which is provided with a packing F of rubber or other suitable material, and G is a screw-threaded plug which is swiveled to the seat member E, so that when the plug G is screwed down within the shell it presses the seat downwardly until the packing F makes contact with a tapered shoulder H. J is the valve proper which is provided with a packing K adapted to make contact with the seat E. The plug G and seat E are provided with a bore through which passes a pin L connected to and preferably running through the valve proper J. The lower end of the pin passes through a sheet metal guide O between which and the valve proper is located a loading spring P. The top of the pin L is upset or swaged, as shown at M, and its bottom is similarly upset or swaged, as shown at N. The pin acts to hold all of the parts together, and as its ends are enlarged by the swaged portions M and N, none of the parts can become separated. The spring P normally presses the valve proper J upwardly, so that the packing K is always in contact with the seat E except when the valve is depressed during the pumping operation. This constant contact of the packing K and seat E is injurious to the packing. It cannot be avoided when the valve is in use, but while the valve is being carried in stock or before it is used, this contact is unnecessary and injurious to the packing of the valve, often causing leakage.

According to the invention illustrated, there is provided a depressor Q which is adapted to maintain the valve away from its seat as shown in Fig. 1. In this construction the depressor is in the form of a cap having a central depressed portion R which preferably projects to a slight extent into the valve nipple and engages the pin L as shown, thereby depressing the valve proper J. The depressor is formed with a series of spring arms S which are designed to frictionally engage the exterior wall of the valve nipple with sufficient force to maintain the valve in its open position.

Figure 3:
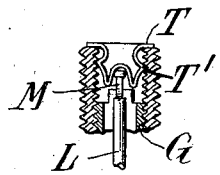
Fig. 3 is a diametrical section of a similar construction.
Figure 2:
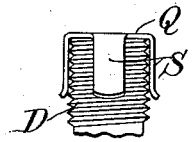
Fig. 2 is an elevation of the upper part of Fig. 1.

In Fig. 3 the depressor comprises a strip of metal T which extends within the valve nipple and engages the valve pin and engages the interior wall of the valve nipple, being preferably provided with projecting portions T' to aid it in this action.

Figure 4:
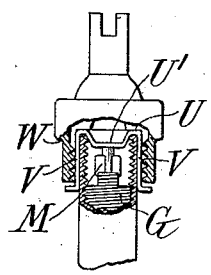
Fig. 4 is a similar section of another construction.

In Fig. 4 is shown a construction which is adapted for use in connection with valves having opposite flat surfaces. In this construction the depressor is formed as a strip of metal U having a depressed portion U' and arms V, the arms being sufficiently thin to lie along the flat portions without interfering with the screwing on of the valve cap W.

When the valve is about to be placed in use in a tire, the depressor is best so constructed that air will leak out of the valve so that if the tire is inflated and the depressor is inadvertently retained, the air within the tire will be permitted to escape. This shows at once that the depressor is intended to be removed and avoids the possibility of the user forming a slow-leaking connection which would cause deflation of the tire when the car is in motion.

While I have shown and described several forms of the invention, it will be understood that I do not wish to be limited thereto since various changes may be made therein without departing from the invention.

What I claim is:—

1. A tire valve depressor formed of a single piece of flat sheet metal, having arms formed by bending the metal adapted to flatwise engage the top of the tire valve, and a portion extending across the top of the valve and adapted to press down the valve pin.

2. A tire valve depressor formed of a single piece of flat sheet metal, having arms formed by bending the metal adapted to flatwise engage the exterior portion of the top of the tire valve, and a bent in depressed portion extending within the top of the valve and adapted to press down the valve pin.

3. The combination of a tire valve having flat surfaces, of a depressor adapted to engage the valve pin and having arms engaging said flat surfaces, said arms being of sufficient thinness to lie between the valve cap and the valve body, whereby the cap may engage the body while the depressor is in place.

4. A tire valve depressor formed of a single piece of sheet metal having elastic arms adapted to frictionally engage the top of the tire valve, and having a portion extending across the top of the valve and adapted to press down the valve pin.

In witness whereof, I have hereunto signed my name.

HENRY P. KRAFT.